United States Patent
Davies

(10) Patent No.: US 11,421,554 B2
(45) Date of Patent: Aug. 23, 2022

(54) GAS TURBINE ENGINE GENERATOR OIL PUMP

(71) Applicant: ROLLS-ROYCE plc, London (GB)

(72) Inventor: Paul R. Davies, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/844,518

(22) Filed: Apr. 9, 2020

(65) Prior Publication Data

US 2020/0362728 A1 Nov. 19, 2020

(30) Foreign Application Priority Data

Apr. 12, 2019 (GB) ..................................... 1905207

(51) Int. Cl.
*F01D 25/20* (2006.01)

(52) U.S. Cl.
CPC .................... *F01D 25/20* (2013.01)

(58) Field of Classification Search
CPC .......... F01D 25/20; F01D 15/10; F01D 25/12; F02C 7/06; F02C 7/12; F02C 7/14; F02C 7/268; F05D 2220/76; F05D 2220/768; F05D 2270/304
See application file for complete search history.

(56) References Cited

U.S. PATENT DOCUMENTS

| | | | | |
|---|---|---|---|---|
| 7,506,724 B2 * | 3/2009 | Delaloye | ................. | F01D 25/18 137/38 |
| 9,200,592 B2 * | 12/2015 | Berryann | ................... | F02K 3/04 |
| 2010/0025148 A1 | 2/2010 | Dawson | | |
| 2017/0334377 A1 * | 11/2017 | Klemen | ................. | B64D 27/10 |

FOREIGN PATENT DOCUMENTS

| | | |
|---|---|---|
| DE | 4304482 A1 | 8/1994 |
| EP | 1852574 A2 | 11/2007 |
| EP | 1873358 A2 | 1/2008 |
| EP | 3171055 | 5/2017 |
| FR | 2925110 A1 * | 6/2009 ............. F01D 25/20 |
| FR | 2925110 A1 | 6/2009 |
| FR | 2937088 A1 | 4/2010 |

OTHER PUBLICATIONS

European search report dated Sep. 9, 2020, issued in EP Patent Application No. 20164891.2.
Great Britain search report dated Oct. 14, 2019, issued in GB Patent Application No. 1905207.5.
Response to Extended European Search Report from counterpart EP Application No. 20164891 2 dated Sep. 18, 2020, filed Feb. 19, 2021, 39 pgs.

* cited by examiner

*Primary Examiner* — Jason H Duger
(74) *Attorney, Agent, or Firm* — Shumaker & Sieffert, P.A.

(57) ABSTRACT

An aircraft gas turbine engine comprises at least a first main engine shaft an electric machine coupled to the main engine shaft, and a lubrication pump configured to provide oil to at least a part of the electric machine. The lubrication pump is controlled by a controller. The controller is configured to operate the lubrication pump in a main gas turbine engine running mode, in which the lubrication pump is driven to provide lubrication to the electric machine at a first flow rate relative to the rotational rate of the main engine shaft, and a fault mode, in which the lubrication pump is driven to provide lubrication to the electric machine at a second, higher flow rate relative to the rotational rate of the main engine shaft.

11 Claims, 6 Drawing Sheets

GAS TURBINE ENGINE GENERATOR OIL PUMP

CROSS-REFERENCE TO RELATED APPLICATIONS

This specification is based upon and claims the benefit of priority from United Kingdom patent application number GB1905207.5 filed on 12Apr. 2019, the entire contents of which are incorporated herein by reference.

BACKGROUND

Technical Field

The present disclosure relates to electric machines of gas turbine engines, and in particular, to lubrication pumps for such electric machines, and the operation thereof.

Description of the Related Art

Aircraft gas turbine engines provide both propulsive and electric power for aircraft. Consequently, such engines comprise electric machines such as generators for providing electric power. Further electric machines in the form of motors configured to drive fluid pumps such as oil and fuel pumps may also be provided.

In particular, a future development may be to include "embedded" electric machines, which reside within the main gas turbine engine, radially inward of the main core gas path. Such arrangements provide dense packaging, but operate within high temperature environments, and so require protection from these environments.

SUMMARY

According to a first aspect there is provided an aircraft gas turbine engine comprising:
at least a first main engine shaft;
an electric machine coupled to the main engine shaft, and;
a lubrication pump configured to provide oil to at least a part of the electric machine, the lubrication pump being controlled by a controller; wherein
the controller is configured to operate the lubrication pump in a main gas turbine engine running mode, in which the lubrication pump is driven to provide lubrication to the electric machine in accordance with a first flow rate schedule, and a fault, start-up or shutdown mode, in which the lubrication pump is driven to provide lubrication to the electric machine in accordance with a second schedule, wherein the first and second schedules are dependent at least in part on main engine shaft rotational speed, and wherein the second schedule comprises operating the lubrication pump at a higher flow rate relative to the main engine shaft rotational speed than the first schedule.

It is desirable to operate the lubrication pump for the electric machine such that, during normal running of the gas turbine engine, the oil flow increases with increasing shaft speed, such that lubrication and cooling of the electric motor can be modulated for the increasing and decreasing shaft speed. However, it has been found that, in the event of an electric machine fault (such as a stator winding short-circuit), the consequent engine shut-down would result in a reduction in lubrication and cooling flow, in view of the reduced engine shaft rotation speed. This may result in arcing, which would otherwise be suppressed by the dielectric properties of the lubricant. Such arcing may in turn result in fire. Consequently, by providing lubrication at a higher rate relative to the main engine shaft speed in the event of an electric machine fault, lubrication flow can be maintained, thereby ensuring that arcing is prevented. Similar conditions arise during startup, wherein the electric machine must be operated at high torque, which requires high current. Consequently, a large amount of heat is generated, yet the engine is turning relatively slowly, and so the oil schedule would normally schedule a relatively small amount of lubricant. By providing lubricant at a higher rate during these conditions, this problem is avoided.

The first and second schedules may be dependent on further engine parameters, such as altitude, airspeed, engine fuel flow, and one or more air pressures, air temperatures, and component temperatures.

The electric machine may comprise an electric motor configured to provide motive power to start the gas turbine engine in a starting mode, and may comprise a generator configured to generate electrical power when in a running mode.

The lubrication pump may be configured to supply oil to one or more of a stator, a bearing, a conductor, a connector, switch gear, and a power electronics device of the electric machine. It has been found that these components are particularly susceptible to arcing in the event of a failure, and so it has been found to be necessary to continue to provide for oil flow in the event of an engine shutdown. These components may also be subjected to relatively high currents, and therefore heating, during startup.

The electric machine may be directly coupled to the main engine shaft, and may be located radially inward of a core engine gas flow path. The invention has been found to be particularly applicable to "embedded" electric machines, which are subject to high temperatures in use. Alternatively, the electric machine may be coupled to the main engine shaft via a gearbox.

The main engine shaft may comprise a low pressure shaft. The gas turbine engine may comprise a fan coupled to a low pressure turbine by the low pressure shaft, and the electric machine may be directly coupled to the low pressure shaft. The gas turbine engine may comprise a high pressure compressor coupled to a high pressure turbine by a high pressure shaft, and the electric machine may be directly coupled to the high pressure shaft. The low and high pressure shafts may be coaxial, and the low pressure shaft may be provided radially inward of the high pressure shaft along at least part of its length.

The electric machine may comprise a permanent magnet electric machine. Permanent magnet electric machines are difficult to shut-down, since they continue to generate electric power as long as the machine rotor is turning. Consequently, it is necessary to either de-clutch the electric machine from the main gas turbine engine shaft in the event of a fault, or to shutdown the gas turbine engine to which the electric machine is coupled. In either case, momentum of the machine rotor and/or gas turbine engine shaft will result in the electric machine rotor continuing to turn for some time, and so electric power will continue to be generated. Consequently, it is particularly desirable in the case of a permanent magnet electric machine to ensure that arcing suppression is continued during engine shut-down.

The lubrication pump may comprise a variable flow pump, configured to provide variable lubricant flow at a given rotational speed. For instance, the lubrication pump could comprise a recirculation valve configured to modulate lubricant flow. The controller could be configured to close the recirculation valve in the event of a fault, to increase lubricant flow relative to the pump speed.

Alternatively, the lubrication pump may comprise a further electric motor, and the controller may be configured to control the further electric motor to control lubricant flow rate.

According to a second aspect of the invention, there is provided a method of operating an oil pump for an electric machine of a gas turbine engine, the electric machine being coupled to a main engine shaft, the method comprising:

detecting one or more of an electric machine fault, and a startup or shutdown mode and, where none of these conditions is detected, operating the lubricant pump in accordance with a first schedule; and where one of these conditions is detected, operating the lubrication pump in accordance with a second schedule; wherein the first and second schedules are dependent at least in part on main engine shaft rotational speed, and wherein the second schedule comprises operating the lubrication pump at a higher flow rate relative to the main engine shaft rotational speed than the first schedule.

The gas turbine engine as described and/or claimed herein may have any suitable general architecture in accordance with the claims. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gas turbine engine may comprise a main fan reduction gearbox interconnecting a turbine and the fan. The main fan reduction gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

DESCRIPTION OF THE DRAWINGS

Embodiments will now be described by way of example only, with reference to the Figures, in which:

With reference to FIG. 1, an aircraft is generally indicated at 1. The aircraft has a pair of propulsors 2, and a pair of wings 3, mounted to a fuselage 4. It will be understood however that the disclosed system is also applicable to different aircraft architectures, such as single engine aircraft, as well as rotorcraft.

With reference to FIG. 2, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

DETAILED DESCRIPTION

Figure 1:
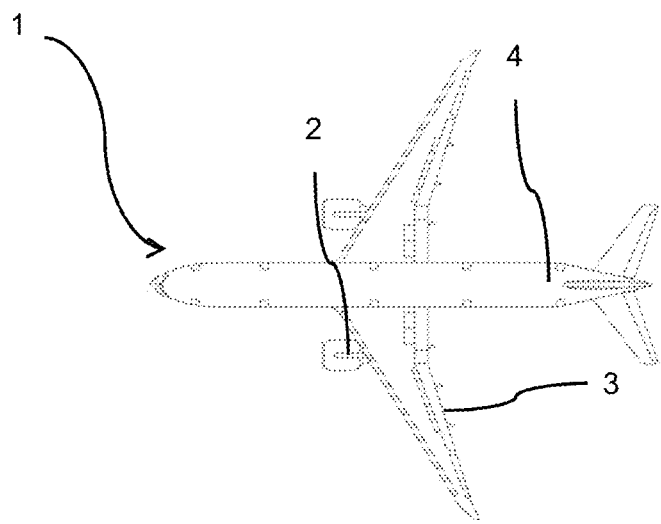
FIG. 1 is a plan view of an aircraft.

During operation, air entering the intake 11 is accelerated by the fan 12 to produce two air flows: a first air flow A into the intermediate-pressure compressor 13 and a second airflow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting high, intermediate and low pressure shafts 24, 25, 26.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. In this example, the gas turbine engine 10 comprises a low pressure shaft mounted motor/generator 28, which is configured to act as a motor to provide additional propulsive power to the fan 12 at times of high thrust demand and/or to start the engine, and is configured to generate electricity at other times. In further examples, the electrical machine 28 may operate as a generator powered by a different one of the above-mentioned interconnecting shafts, or as a motor powering e.g. a pump of the engine's fuel or oil system or an actuator(s) which adjust variable vanes of the engine.

Figure 2:
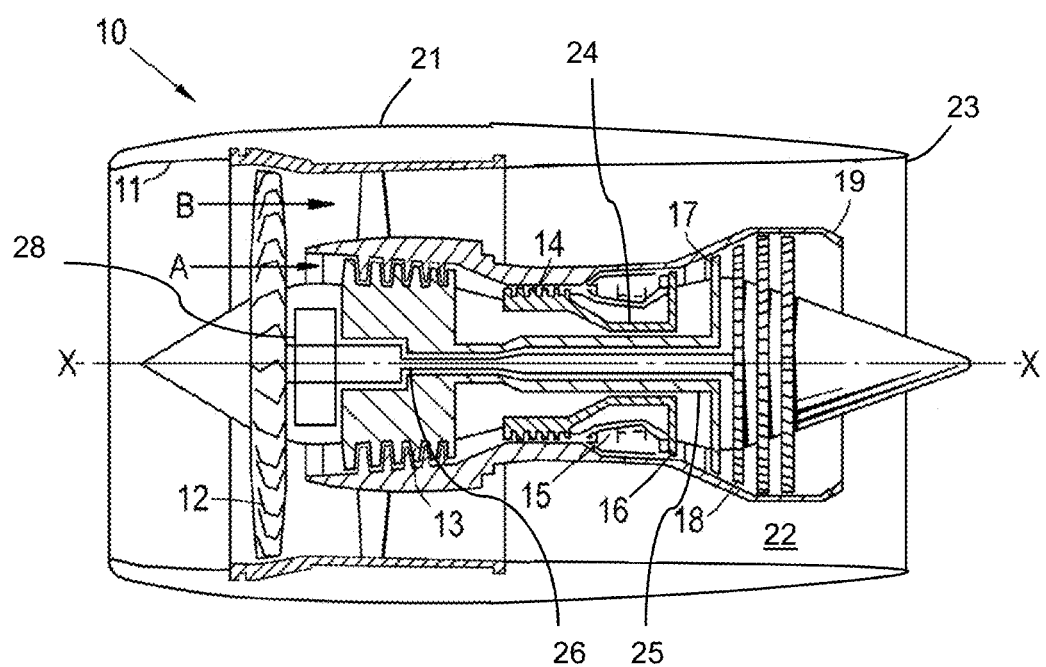
FIG. 2 is a sectional side view of a gas turbine engine.

The motor/generator 28 is arranged in a so-called "embedded" configuration. As can be seen from FIG. 2, the motor/generator 28 is co-axial with the low pressure shaft 26, and is installed radially inward of the main gas flow path A. The motor/generator 28 is coupled to the low pressure shaft 26, such that the motor/generator 28 rotates with the shaft 26.

Figure 3:
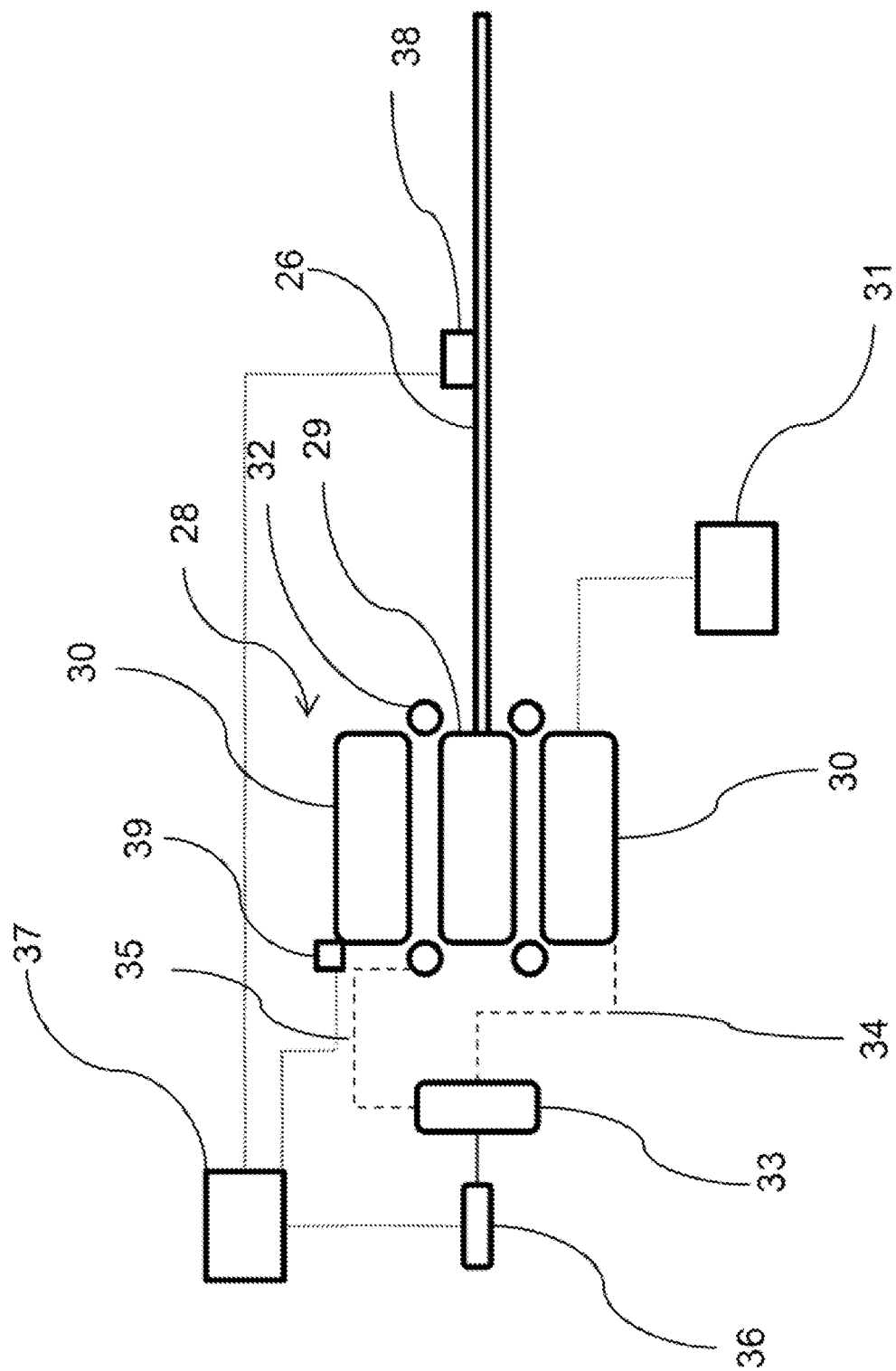
FIG. 3 is a schematic plan of an electric machine and a first lubrication system of the gas turbine engine of FIG. 2.

FIG. 3 shows a schematic arrangement of the electric motor 28, along with an associated control and lubrication system. The motor 28 is of a permanent magnet type, having a rotor 29 comprising a plurality of permanent magnets (not shown). The motor 28 further comprises a stator 30 comprising a plurality of stator windings (not shown). The stator windings are energised by electrical power provided by a power source such as a motor controller 31. The rotor 29 is coupled to the low pressure shaft 26, and is supported by bearings 32.

Both the stator 30 and the bearings 32 are provided with cooling oil by a lubrication system. It will be understood however that only one of these motor components might be cooled or lubricated, or further components may also be cooled and lubricated. The lubrication system comprises a lubrication pump 33, which provides oil to at least the stator 30 and bearings 32 via respective oil supply lines 34, 35. The bearing supply lines may be integrated with engine oil supply lines. Oil may also be supplied to the rotor, as well as further components such as switches, electrical connectors, power electronics etc. The lubrication pump is in turn powered by an oil pump motor 36, which is controlled by a lubrication system controller 37. The lubrication pump 33 is configured to pump a lubricant such as oil. The oil may comprise mineral or synthetic oil, having cooling, lubricating and dielectric properties.

The lubrication system controller is in signal communication with a shaft speed sensor, and is also in signal communication with the stator windings or a stator status sensor 39, which is configured to detect electric machine 28 faults, such as stator winding short circuits.

The motor 36 is configured to rotate at different speeds in use, to provide different oil flow rates to electric machine 28 components, as determined by the controller 37.

Figure 5:
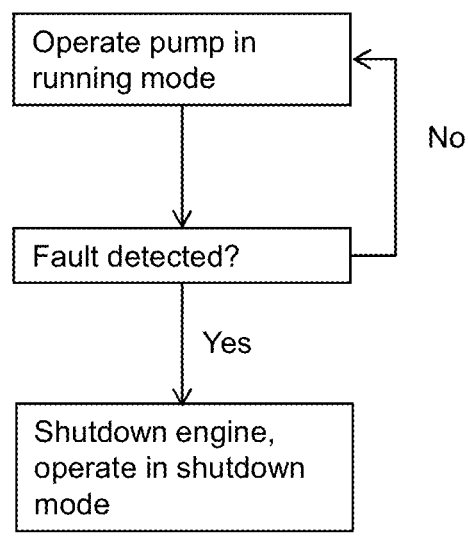
FIG. 5 is a flow diagram showing a method of operating the electric machine and lubrication system of FIG. 3 or FIG. 4.

Referring now to FIGS. 3 and 5, the lubricant system is operated as follows. During normal running, where the gas turbine operation 10 is operating, the controller 37 operates in accordance with a first schedule, which includes determining a shaft speed of the shaft to which the rotor 29 of the electric machine 29 is coupled (in this case the low pressure shaft). The controller 37 actuates the lubricant pump motor 36 to provide metered oil flow at a rate that is proportional to the shaft speed as determined by the shaft speed sensor 38, multiplied by a first constant $C_1$. In other words:

*oil* flow rate=$C_1 \times$ *shaft speed*

Consequently, as shaft speed increases, pump speed increases, as determined by the first constant $C_1$.

Alternatively, a non-linear schedule may be provided, with the pump speed varying non-linearly with speed, but still in dependence on shaft speed, e.g. the above equation may be of an exponential form, with shaft speed as a variable.

The schedule may optionally include further parameters, which may be included as variables in the above oil flow rate equation. For instance, the schedule may include altitude. Typically, oil flow rate is scheduled to reduce with increased altitude, as the fuel flow rate typically reduces with increasing altitude, resulting in reduced heat loads to components. Such a schedule may then take the form:

$$\text{oil flow rate} = C_1 \times \frac{\text{shaft speed}}{\text{altitude} \times C_3}$$

Where altitude may comprise indicated altitude in, say metres, and $C_3$ is a further constant. Consequently, in accordance with such a schedule, the oil flow rate would be scheduled in accordance with shaft speed, but adjusted to take into account altitude. Similarly, the schedule may take into account fuel flow directly, with reduced fuel flow resulting in a reduced oil flow rate for a given engine main shaft speed.

The schedule may comprise still further parameters, to correct for other variables. Typical parameters include total inlet air pressure and temperature, turbine inlet temperature, and component temperatures.

During operation, the controller 37 continually monitors aspects of the electric machine 28 for faults. If a fault is detected, then the controller 37 operates in accordance with a fault mode.

In the fault mode, a shut-down signal is provided to a gas turbine engine controller (not shown). Consequently, the engine 10 is shut-down, and the gas turbine engine shafts/shafts 24, 25, 26 begin to slow. In other embodiments, the gas turbine engine controller may initiate a shut-down signal to the lubricant controller 37, which would initiate operation of the lubrication system in the fault mode. The lubricant controller 37 then operated in a second schedule in accordance with a fault mode. Operation in the fault mode is then similar to operation in the normal running mode, and so controller 37 actuates the lubricant pump motor 36 to provide metered oil flow at a rate that is proportional to the shaft speed as determined by the shaft speed sensor 38, multiplied by a constant. Again, further parameters such as altitude etc may be taken into account. However, the constant in this case is a second constant $C_2$, which is in each case greater than $C_1$:

Oil flow rate=$C_2$×shaft speed $C_2 > C_1$

Consequently, for a given shaft speed, the pump speed will be increased in the fault mode relative to the normal running mode. In some cases, the shaft speed sensor may be damaged during operation. Consequently, a shaft speed may be assumed, e.g. by a model, which assumes a constant deceleration rate overtime. In such a case, the pump speed is controlled in accordance with the modelled shaft speed, rather than a sensed shaft speed.

This has been found to be advantageous. In the event of a fault with the electric motor, the gas turbine engine may have to be shut-down, resulting in slower operation of the engine during shutdown and potentially also during subsequent wind-milling. In such a case, if the lubrication system were to continue to be operated in the running mode, oil lubrication would be reduced in proportion to the reduced engine shaft speed. However, the environment in the embedded electric machine 28 is still hot during shutdown, and the electric machine will continue to act as a generator, since the electric machine 28 is a permanent magnet electric machine, and the gas turbine engine continues to rotate. Consequently, particularly where the machine is operated at high altitude, a risk of arcing exists. Such arcing can cause damage to electrical and mechanical components, and can in some cases cause a fire. The lubricant is typically a dielectric, and so can be prevent such arcing. However, where the flow is reduced or stopped, insufficient oil may be present to prevent arcing, or the oil may boil away due to the high temperatures. Additionally, by providing a large quantity of oil, the mixture within the stator and other lubricated systems is "fuel rich", and so may be above the rich extinction limit for combustion.

Consequently, in the present disclosure, the oil flow continues during shutdown at a rate that is higher in relation to the shaft speed than during normal operation. This ensures that arcing is prevented, thereby increasing safety.

Figure 6:
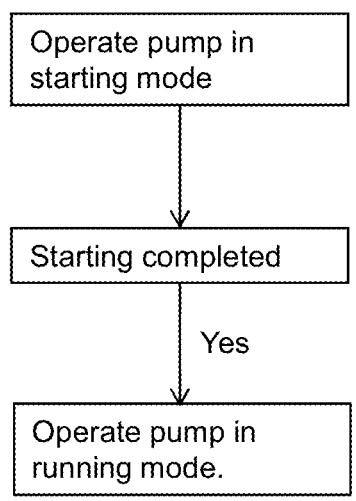
FIG. 6 is a flow diagram showing a further method of operating the electric machine and lubrication system of FIG. 3 or FIG. 4.

Referring to FIG. 6, the controller 37 may also operate the pump 33 in accordance with the second operating schedule, or in accordance with a third operating schedule in the form of a start-up mode during starting of the gas turbine engine 10 where the motor 28 is used as a starter motor. During such operation, torque requirements are very high, in view of the combination of low motor speed and high power requirements for turning over the engine. Consequently, the current draw by the motor 28 may be high during this operation, resulting in high heat output, while the shaft rotational speed is low. Consequently, there is again a risk of arcing or other faults if the lubrication pump 33 is operated in accordance with the normal running mode.

Consequently, during starting, the pump 33 is operated according to a starting mode, which is similar to the fault mode described above, with the pump operated to provide an oil flow rate per shaft speed, higher than the running mode:

Oil flow rate=$C_3$×shaft speed $C_3 > C_1$

Once start-up is completed, the system reverts to the running mode.

Figure 4:
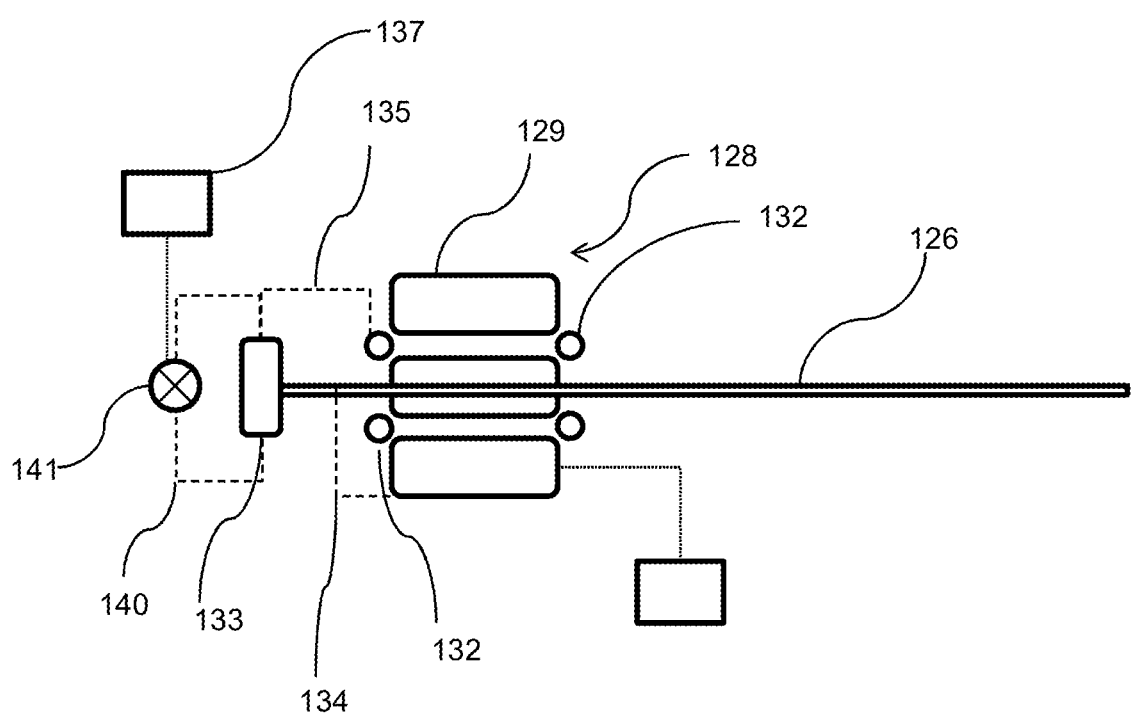
FIG. 4 is a schematic plan of an electric machine and a second lubrication system of the gas turbine engine of FIG. 2.

FIG. 4 shows an alternative lubrication system. A motor 128 having a stator 129 is provided, which is driven by a shaft 126. Similarly, bearings 132 are provided, as well as a lubricant pump 133. The motor 128, shaft 126 and bearings 132 are similar to equivalent components 28, 26, 32 of the first embodiment. However, the pump in this embodiment is mechanically driven by the shaft 126.

The lubrication system includes pump outlet lines 134, 145, which provide lubricant to the lubricated components (e.g. the bearings 132 and stator 129). The lubrication system also comprises a bypass oil line 140, which allows oil to be recirculated from an output of the pump 133, back to the inlet, bypassing the lubricated electric machine components. Flow through the oil line 140 is controlled by a valve 141, which can open to increase oil flow through the bypass line, and so decrease flow through the lubricated components. Further valves (not shown) may be provided to individually control oil flow through the individual lubricated components. The valve(s) are operated by a controller 137, to control oil flow through the components.

Again, the lubrication system is operated in normal use such that the lubrication provided to the components is modulated in relation to the shaft 126 speed. This will be the case, since the lubrication pump 133 is directly coupled to the shaft 126, and so increasing shaft speed will result in increasing oil flow. The controller 137 operates the valve 141 such that the valve is at least partially open, such that oil is recirculated through the bypass valve. Consequently, oil flow to the lubricated motor components is reduced as a proportion of shaft speed, relative to where the valve 141 is closed.

In the event of an engine shutdown, a signal is received by the controller 137, which actuates the valve to shut the valve 141, or at least further close the valve 141 to reduce bypass flow. Consequently, oil flow to the lubricated components as a proportion of oil pump outlet flow is increased, and so oil flow to the lubricated components relative to shaft speed is increased.

In such a case, the shaft speed sensor can be omitted, as well as the pump motor. However, this arrangement may be less mechanically efficient.

Alternative arrangements can be envisaged, such as variable flow pumps, having variable vanes allowing for different flow rates at the same speed. Similarly, it will be understood that the electrical machine could be provided in a different installation arrangement, such as part of an accessory gearbox coupled to a main engine shaft via an accessory drive shaft. The electrical machine could be of a different type, such as an induction machine. The electrical machine could be coupled to any of the low, intermediate or high pressure shafts.

The disclosed system could be applied to gas turbine engines having different architectures, such as open rotor, turboshaft or turboprop engines. The engine could have a different number of main engine shafts, such as two or one.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the electric machine may comprise a different type of electrical machine, such as an induction machine. The electrical machine may be coupled to a different main engine shaft, and may not be located within the main gas path, but instead be located outside the engine core within an engine core housing or bypass nacelle, and may be coupled to the main engine shaft by a bevel gear arrangement and radial offtake shaft.

The invention claimed is:

1. An aircraft gas turbine engine comprising:
a main engine shaft;
an electric machine coupled to the main engine shaft, and;
a lubrication pump configured to provide oil to at least a part of the electric machine, the lubrication pump being controlled by a controller;
wherein the controller is configured to operate the lubrication pump in a main gas turbine engine running mode, in which the lubrication pump is driven to provide lubrication to the electric machine in accordance with a first flow rate schedule, and a fault mode, in which the lubrication pump is driven to provide lubrication to the electric machine in accordance with a second schedule,
wherein the controller is configured to detect a fault of the electric machine, and control the lubricant pump in accordance with the fault mode when the fault of the electric machine is detected,
wherein the first and second schedules are dependent at least in part on main engine shaft rotational speed, and
wherein the second schedule comprises operating the lubrication pump such that the oil is provided at a higher flow rate relative to the main engine shaft rotational speed than when the lubrication pump is operated according to the first schedule.

2. The gas turbine of claim 1, wherein the first and second schedules are dependent on further engine parameters comprising one or more of altitude, airspeed, fuel flow, and one or more air pressures, air temperatures, and component temperatures.

3. The gas turbine of claim 1, wherein the electric machine comprises an electric motor configured to provide motive power, and configured to generate electrical power.

4. The gas turbine of claim 1, wherein the lubrication pump is configured to supply oil to one or more of a stator of the electric machine, and a bearing of the electric machine.

5. The gas turbine of claim 1, wherein the electric machine is directly coupled to the main engine shaft, and is located radially inward of a core engine gas flow path.

6. The gas turbine of claim 1, wherein the main engine shaft comprises a low pressure shaft, the gas turbine engine comprises a fan coupled to a low pressure turbine by the low pressure shaft, and the electric machine is directly coupled to the low pressure shaft.

7. The gas turbine of claim 1, wherein the electric machine comprises a permanent magnet electric machine.

8. The gas turbine of claim 1, wherein the lubricant pump comprises a variable flow pump, configured to provide variable lubricant flow at a given rotational speed.

9. The gas turbine of claim 8, wherein the lubricant pump comprises a recirculation valve configured to modulate lubricant flow.

10. The gas turbine of claim 3, wherein the gas turbine engine comprises a further electric motor, and the controller is configured to control the further electric motor to control lubricant flow rate.

11. A method of operating a lubrication pump for an electric machine of a gas turbine engine, the electric machine being coupled to a main engine shaft, wherein the lubrication pump is configured to provide oil to at least part of the electric machine, the method comprising:
monitoring the electric machine for an electric machine fault,
in response to the monitoring not detecting the electric machine fault, operating the lubrication pump in accordance with a first schedule, and
in response to the monitoring not detecting the electric machine fault, operating the lubrication pump in accordance with a second schedule;
wherein the first and second schedules are dependent at least in part on main engine shaft rotational speed, and wherein the second schedule comprises operating the lubrication pump such that the oil is provided at a higher flow rate relative to the main engine shaft rotational speed than when the lubrication pump is operated according to the first schedule.

* * * * *